United States Patent [19]

Mori

[11] Patent Number: 5,050,964
[45] Date of Patent: Sep. 24, 1991

[54] OBJECTIVE LENS SUPPORTING MECHANISM FOR USE IN AN OPTICAL HEAD OF AN OPTICAL DISC APPARATUS

[75] Inventor: Yasuto Mori, Osaka, Japan

[73] Assignee: NEC Home Electronics Ltd., Osaka, Japan

[21] Appl. No.: 369,203

[22] Filed: Jun. 16, 1989

[30] Foreign Application Priority Data

Jun. 27, 1988 [JP] Japan .................. 63-157596

[51] Int. Cl.$^5$ ................................. G02B 7/02
[52] U.S. Cl. ................. 359/813; 369/44.16; 359/823
[58] Field of Search ............ 350/247, 255, 257; 369/44, 45, 46, 44.15, 44.16

[56] References Cited

U.S. PATENT DOCUMENTS

| 4,750,164 | 6/1988 | Nose | 350/255 |
| 4,766,583 | 8/1988 | Oinoue et al. | 350/247 |
| 4,782,475 | 11/1988 | Chandler | 369/45 |
| 4,818,066 | 4/1989 | Nose | 350/247 |

FOREIGN PATENT DOCUMENTS

| 0233313 | 8/1987 | European Pat. Off. |
| 62-145330 | 9/1986 | Japan . |
| 61-145334 | 9/1986 | Japan . |
| 61-163331 | 10/1986 | Japan . |
| 62-92143 | 4/1987 | Japan . |

OTHER PUBLICATIONS

Shiyunsuke Takahashi, "Support for Movable Part of Optical Pickup", Patent Abstracts of Japan, Jan. 28, 1986, vol. 10, No. 22 (P-424)[2079].

Akihiro Kasahara, "Optical Head Device", Patent Abstracts of Japan, Sep. 5, 1986, vol. 10, No. 260 (P-494)[2316].

Primary Examiner—Loha Ben
Attorney, Agent, or Firm—Cushman, Darby & Cushman

[57] ABSTRACT

An objective lens supporting mechanism having a spring assembly for supporting an objective lens holder in a tracking direction, which leaf spring includes two leaf springs crossing to each other thereby forming a crossing axis which is in parallel to an optical axis of the objective lens.

20 Claims, 4 Drawing Sheets

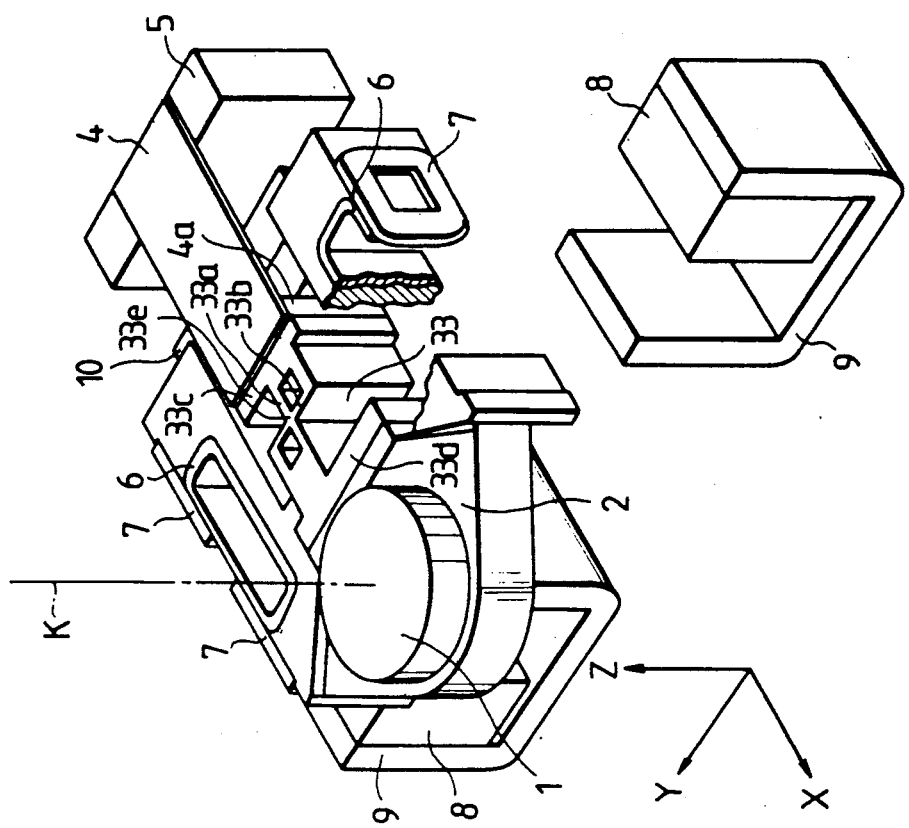
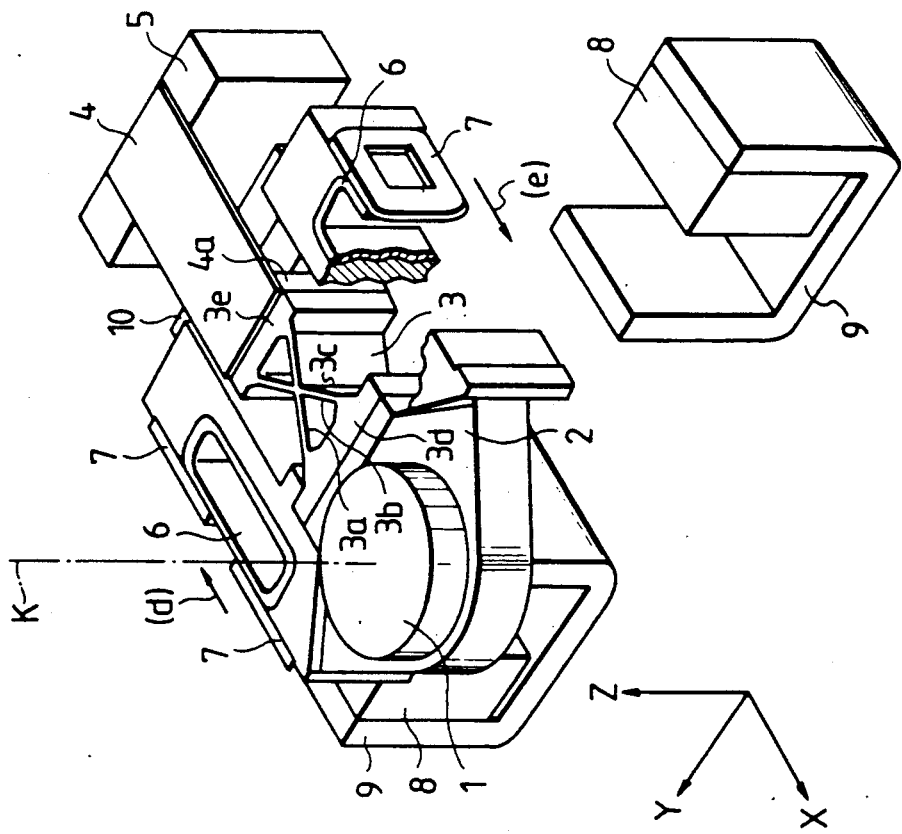

OBJECTIVE LENS SUPPORTING MECHANISM FOR USE IN AN OPTICAL HEAD OF AN OPTICAL DISC APPARATUS

FIELD OF THE INVENTION

The present invention relates generally to an objective lens supporting mechanism for use in an objective lens actuator of an optical head for an optical disc apparatus. More particularly, the invention relates to a supporting mechanism for supporting an objective lens pivotally movable in a tracking direction.

BACKGROUND OF THE INVENTION

There has been known a conventional objective lens supporting mechanism employed in an optical lens actuator for an optical disc apparatus as shown in FIG. 1 (Prior Art).

The objective lens supporting mechanism shown in FIG. 1 is provided with an objective lens holder 22 for holding thereon an objective lens 21, a pair of parallel leaf springs 23 for supporting the lens holder 22 in a tracking direction y and a pair of parallel leaf springs 24 for supporting the lens holder 22 in a focusing direction z. The supporting mechanism is further provided with a supporting base for supporting a base end of the leaf springs 24, a focusing coil 26 and a tracking coil 27. In FIG. 1 (Prior Art), an arrow x directs a longitudinal axis of the actuator, arrow y directs a tracking direction and arrow z directs an optical axis of the objective lens that is a focusing direction.

Further, there has been known another conventional objective lens supporting mechanism in which the objective lens holder is supported by four suspension wires instead of leaf springs and the like.

The conventional objective lens supporting mechanisms described above would raise a problem that a rolling of the lens holder easily occurs because of unbalance in weight of the movable parts, unbalance in left and right directions of electromagnetic forces during focusing or tracking actuations. For example, as shown in FIG. 2 (Prior Art), two forces a and b directly opposite to each other are applied to the leaf springs 23 for supporting the lens holder 22 in the tracking direction y. The two forces act as a distorting force on the leaf springs 23 since ore force does not suppress the other. Therefore, the movable part would be distorted and vibrated along the direction x as shown in arrow c in FIG. 2 (Prior Art), also thereby deforming an optical axis z of the objective lens 21. In FIG. 2 (Prior Art), the upper side is a free end (facing the objective lens holder) side while the lower side is a fixed end side.

SUMMARY OF THE INVENTION

In view of the above-noted problems of the conventional mechanism, an object of the present invention is to provide an objective lens supporting mechanism in which a deformation or inclination of the optical axis of the objective lens is prevented even if there is an unbalance in weight of the movable parts or an unbalance in left and right directions of electromagnetic forces during focusing or tracking actuations is occurred.

Another object of the invention is to provide an objective lens supporting mechanism in which a resonance of the objective lens supporting system is prevented from transferring to an actuator base side.

The foregoing and other objects have been achieved by the provision of an objective lens supporting mechanism which, according to the present invention, has a spring assembly for supporting an objective lens holder in a tracking direction, which spring assembly comprises two leaf springs crossing each other thereby forming a crossing axis which is parallel to an optical axis of the objective lens. The spring assembly is formed of a resin as one unit.

When an actuating force in the tracking direction is applied to the objective lens supported by the spring assembly of the invention, a position of the crossing axis of the spring assembly does not move. A free end side of the lens holder with respect to the crossing axis is distorted in the tracking direction so that the objective lens rotates around an axis nearby the crossing axis of the spring assembly.

BRIEF DESCRIPTION OF THE DRAWINGS

FIG. 3 is a cut-away perspective view of an objective lens actuator having an objective lens supporting mechanism of a first embodiment of the present invention;

FIG. 7 is a cut-away perspective view of an objective lens actuator having an objective lens supporting mechanism according to a second embodiment of the present invention;

DESCRIPTION OF THE PREFERRED EMBODIMENTS

Figure 1:
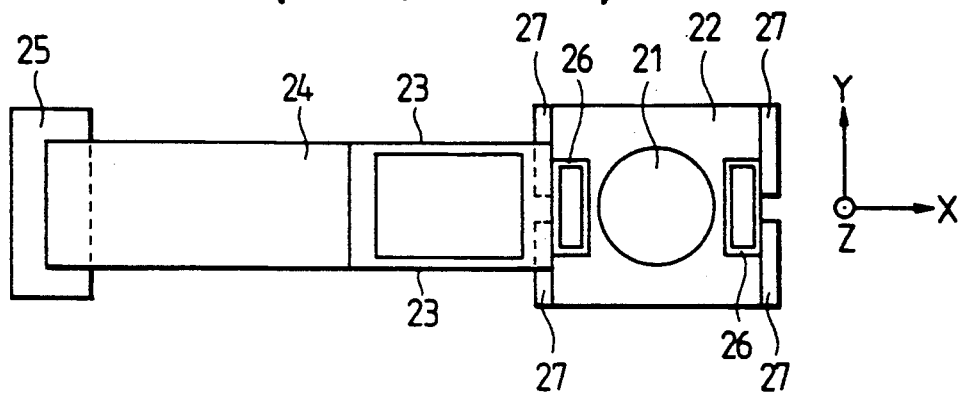
FIG. 1 (Prior Art) is a partial plan view of an objective lens actuator having a conventional objective lens supporting mechanism.
Figure 2:
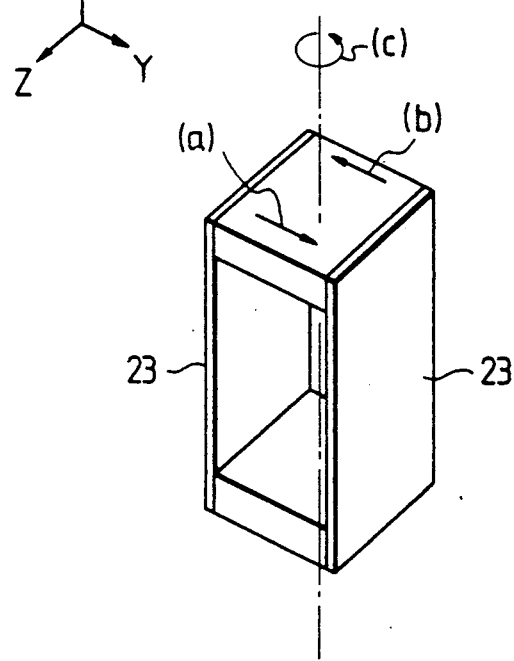
FIG. 2 (Prior Art) is a perspective view showing parallel leaf springs employed in the lens supporting mechanism of FIG. 1.

Preferred embodiments of the present invention will now be described hereinbelow with reference to the accompanying drawings.

In the drawings, like parts and components are designated by the same reference numerals.

Figure 4:
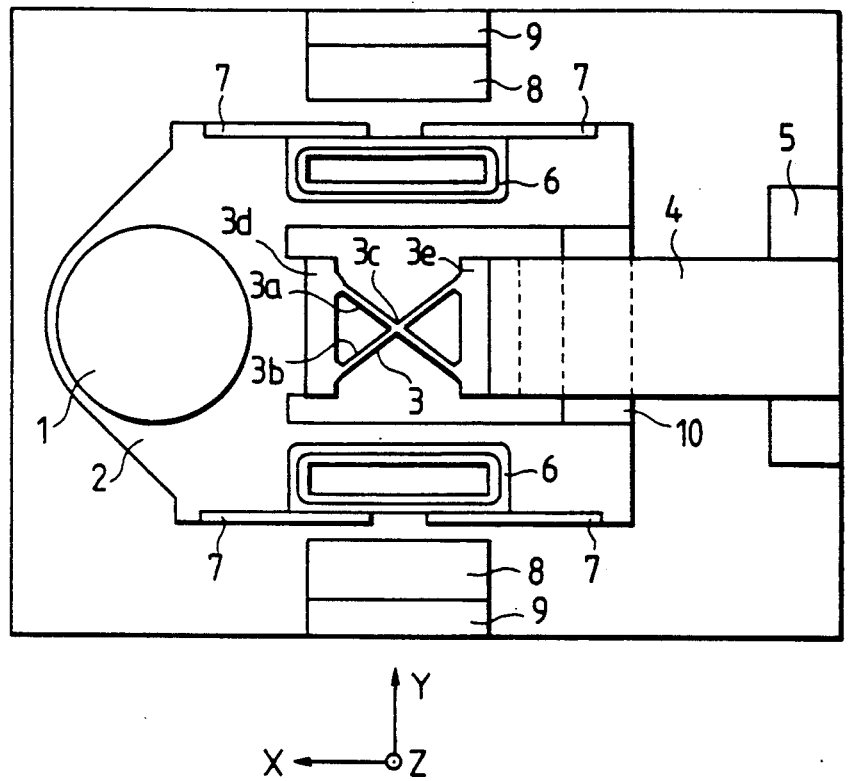
FIG. 4 is a plan view of the objective lens actuator of FIG. 3.

FIG. 3 is a perspective view showing an objective lens actuator having an objective lens supporting mechanism according to a first embodiment of the present invention. FIG. 4 is a plan view of the objective lens actuator shown in FIG. 3.

The objective lens actuator shown in FIGS. 3 and 4 is provided with an objective lens 1, an objective lens holder mounting thereon the objective lens 1 and a spring assembly 3 for supporting the objective lens holder 2 in a tracking direction. The spring assembly 3 is formed of resin as one unit and comprises two leaf springs 3a and 3b crossing each other for forming a crossing axis 3c which is parallel to an optical axis K of the objective lens 1. The springs 3a and 3b cross at 45 degree and 135 degree angles with respect to a longitudinal axis of the objective lens actuator. The spring assembly 3 has fixing block parts 3d and 3e at both sides thereof.

The objective lens holder 2 is fixed by adhering to the fixing block part 3d of the spring assembly 3. The other fixing block part 3e is fixed by adhering to a block part 4a of a pair of parallel leaf springs 4 the base end of which are secured to a leaf spring supporting base 5. At least one part of the leaf spring supporting base 5 may be formed of an elastic material such as resin, organic rubber or the like. If the supporting base is formed of the elastic material, a resonance including a secondary resonance is absorbed by the supporting base. In this case, a servo characteristic of the actuator is not deteriorated.

A pair of cylindrical focusing coils 6 are disposed on both sides in a y direction of the objective lens holder 2. Two tracking coils 7 are disposed outside of each of the focusing coils 6. A magnet 8 fixed to a yoke 9 is positioned outside of each focusing coil 6 and tracking coils 7 facing thereto. The objective lens actuator shown in FIGS. 3 and 4 is also provided with a counter balance controller 10 for controlling a center of gravity of the objective lens holder 2 and the like. The controller 10 passes through a space between the parallel leaf springs 4 and connects to the objective lens holder 2 at both side portions thereof.

In the objective lens actuator thus structured, when a focusing controlling current is supplied to the focusing coil 6, an electromagnetic force is generated on the focusing coil 6 which is positioned in a magnetic field of the magnet 8 so that the objective lens holder 2 is pivotally moved in the focusing direction z by the actuating force of the electromagnetic force.

On the other hand, when a tracking controlling current is supplied to the tracking coil 7, one of the tracking coils 7 generates an electromagnetic force directing to an arrow d on the axis x while the other tracking coil generates an electromagnetic force directing to an arrow e opposite arrow d. Under such a condition, the objective lens holder 2 is pivotally moved in the tracking direction y along an axis nearby the crossing axis 3c of the spring assembly 3.

The operation of the objective lens holder in the tracking direction will be described below in detail.

Figure 5:
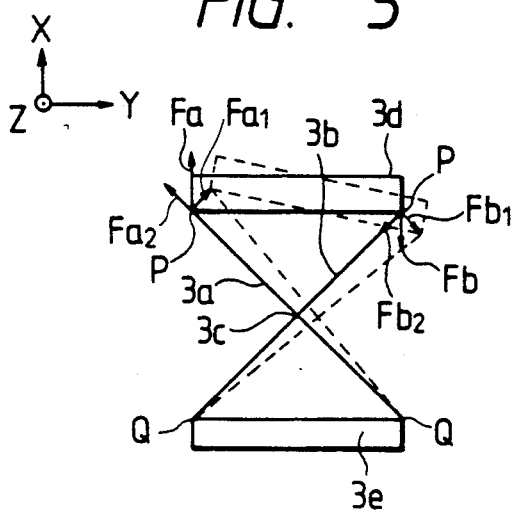
FIG. 5 is a diagrammatic view of a spring assembly of the present invention.
Figure 6:
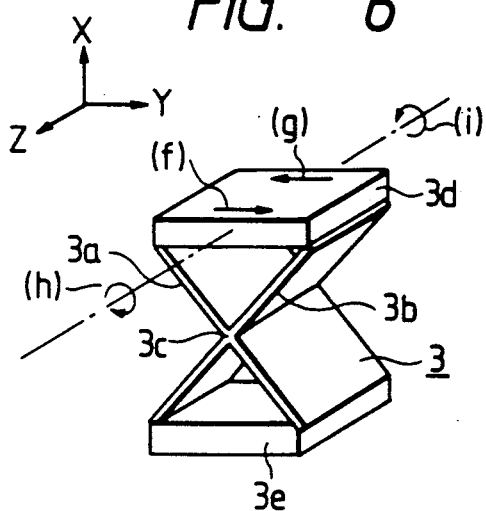
FIG. 6 is a perspective view of the spring assembly of FIG. 5.

As shown in FIG. 5, when an actuating force is applied in the tracking direction, forces Fa and Fb are applied to free ends of the leaf springs 3a and 3b, respectively. In FIG. 5 the free ends of the fixing block parts 3d and 3e of the spring assembly 3 are designated by P and Q, respectively.

The force Fa is divided by vector into a force $Fa_1$ and $Fa_2$ where $Fa_1$ acts to distort the leaf spring 3a while $Fa_2$ acts to depress the leaf spring 3a. Similarly, the force Fb is divided by vector into a force $Fb_1$ acting to distort the leaf spring 3b and a force $Fb_2$ acting to compress the leaf spring 3b.

Actually, even if the force $Fa_2$ acting to depress the leaf spring 3a and the force $Fb_2$ acting to compress it are applied, an amount of expansion and contraction of the leaf springs 3a and 3b can be ignored since these forces $Fa_2$ and $Fb_2$ are much smaller than a distorting amount of the leaf springs 3a and 3b due to the forces $Fa_1$ and $Fb_1$. As a result, each of the leaf springs 3a and 3b of the spring assembly 3 is actually distorted as shown in a dotted line in FIG. 5. The block 3d of the spring assembly 3 at the free end thereof rotates along an axis nearby the crossing axis 3c of the spring assembly 3. Therefore, the objective lens 1 moves in the tracking direction y together with the objective lens holder 2.

Described below is the operation of the spring assembly 3 in case of occurrence of unbalance in electromagnetic force during the focusing and tracking actuations and of unbalance in weight balance of the movable parts including the objective lens 1, objective lens holder 2, counter balance controller 10, focusing coil 6 and tracking coil 7.

When two forces (f) and (g) directly opposite to each other are applied to the block 3d of the spring assembly 3 positioned at the objective lens holder side thereof, the movable part is distorted and vibrated due to the forces (f) and (g) along the axis. However, such a distortion and vibration does not influence the optical axis K (axis z) of the objective lens 1 since a distortion force (h) by the force (f) cancels a distortion force (i) by the force (g) which is opposite the distortion force (h). Hence, even if an unbalance in weight balance or unbalance in the focusing and tracking actuations of the movable parts occurs, the optical axis of the objective lens 1 is not deformed or inclined. Thus, as a primary purpose of the present invention, distortion is prevented along an x-axis, and as an incidental subpurpose, vibration along a z-axis is resisted.

FIG. 7 is a perspective view showing an objective lens actuator according to a second embodiment of the present invention.

In the second embodiment also, a spring assembly 33 is constituted by two leaf springs 33a and 33b crossing to each other for forming a crossing axis 33c which is the same as that of the first embodiment. In this embodiment, however, crossing directions of the leaf springs 33a and 33b direct in the directions x and y directing perpendicularly to the direction x. That is, the crossing directions are at 0 degree and 90 degree angles with respect to the longitudinal axis of the objective lens actuator. Other parts and components of the second embodiment are the same as those of the first embodiment, and therefore, they are designated by the same reference numerals.

In the second embodiment also, the objective lens 1 pivotally moves along the axis nearby a crossing axis 33c of the spring assembly 33 as is the same as that in the first embodiment. Further, when an unbalance in electromagnetic force occurs, the optical axis K of the objective lens 1 is not deformed or inclined.

Figure 8:
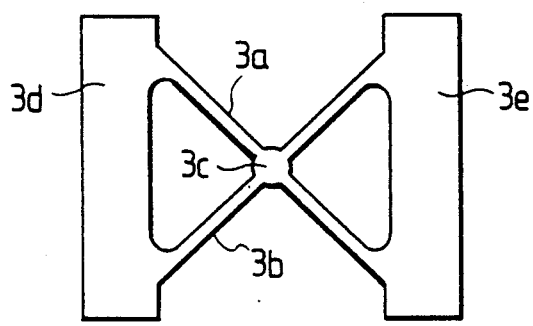
FIG. 8 is a plan view showing an arrangement of a crossing axis of the spring assembly of the invention.
Figure 9:
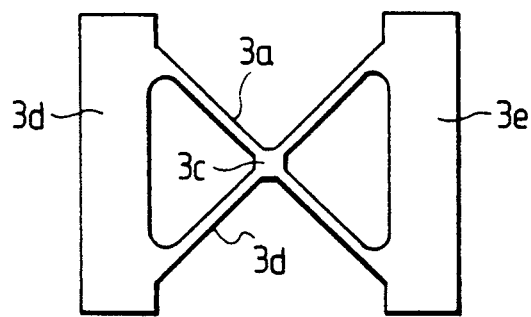
FIG. 9 shows another arrangement of the crossing axis according to the invention.
Figure 10:
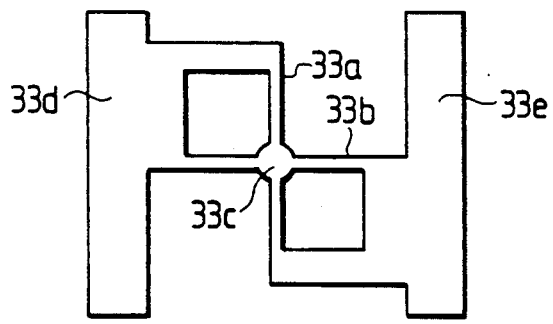
FIG. 10 shows still another arrangement of the crossing axis of the invention.

A portion of the crossing axis 3c (33c) of the spring assembly 3 (33) of the present invention may preferably be arranged as shown in FIGS. 8-10 considering the molding of the spring by a resin. That is, the portion of the crossing axis 3c (33c) may be formed thick in a direction of a bisector of each crossing angle.

While the spring assembly 3 (33) is injection molded as one unit, the molded spring is ejected out of a mold by an ejection pin. Therefore, the spring should have a space sufficient to be pushed out by the ejection pin. The spring assembly 3 (33) of the present invention described above is provided with the two connecting blocks 3d (33d) and 3e (33e) which are suitable spaces to be pushed by the ejection pin. However, pushing merely the two portions would raise a problem in that the leaf springs 3a (33a) and 3b (33b) may be deformed in some cases. The thickness of each of the leaf springs 3a (33a) and 3b (33b) is relatively thin, an actual thickness of which may preferably be within a range between 0.1-0.15 mm. Accordingly, a normal crossing portion of the spring assembly 3 (33) would not provide a sufficient space for pushing by the ejection pin.

Under the above situation, the crossing portion 3c (33c) should be formed thick. By such an arrangement, the spring assembly 3 (33) can reliably be ejected out of a mold without deforming the leaf springs 3a (33a) or 3b (33b) by pushing by ejection pins the thick crossing portion 3c (33c) together with the two connecting blocks 3d (33d) and 3e (33e).

One arrangement shown in FIG. 8 shows a thickened crossing portion constituting the crossing axis 3c which is substantially round shaped. FIG. 9 shows another arrangement of the thickened crossing portion 3c which is substantially square shaped. In these two arrangements, the crossing portion 3c is related to the first embodiment of the invention shown in FIG. 3 and formed thick in directions x and y. There is still another arrangement as shown in FIG. 10 in which a crossing portion constituting the crossing axis 33c is related to the first embodiment of the invention shown at FIG. 7 and formed thick in 45° and 135° angles with respect to directions x and y. The crossing portion 33c shown in FIG. 10 is substantially round shaped. Alternatively, the crossing portion 33c may be substantially square shaped. In any event, the crossing portion is formed thick in a direction of a bisector of each crossing angle of the two leaf springs.

However, the arrangement of the crossing portion is not limited to the arrangements described above. That is, the crossing portion may be thickened merely one direction that is, in a direction of x or y. Moreover, a range of the thickened space may appropriately be set in accordance with a diameter of an employed ejection pin, which range is normally within a range between 0.3-0.5 mm.

In each of the embodiments of the invention described above, a center of gravity of the movable part may preferably be set to be intersected by the crossing axis 3c (33c) of the spring assembly 3 (33). If the center of gravity of the movable parts is set as such, a center of pivotal movement of the movable part is positioned equal to a point of action of a resultant of the actuating forces which are applied to the spring assembly 3 (33). Therefore, a constant vibration mode can be obtained, and an undesired rolling of the objective lens holder or the like would not occur during the vibration.

The optical head is moved while the tracking control is not being performed during a random-access action. Under this action, the movable parts would not swing due to an inertial force when the optical head stops if the center of gravity of the movable parts is intersected by the crossing axis 3c (33c) of the spring assembly 3 (33).

The embodiments above are provided with merely one spring assembly. However, the invention is not limited thereto or thereby. That is, the spring assembly can comprise by a plurality of crossing leaf springs accumulated in a direction of the crossing axis. For example, two or three crossing leaf spring assemblies may be accumulated. In this case, the crossing axes of each of the plurality of crossing leaf spring assemblies lie on one line.

Moreover, the spring assembly may be unitary formed with the objective lens holder 2 or the parallel leaf spring 4 for supporting the holder in a focusing direction.

As described above, according to the present invention, since the objective lens actuator is provided with a spring assembly for supporting the objective lens holder, which spring assembly comprises two leaf springs crossing to each other for forming a crossing axis which is parallel to the optical axis of the objective lens, the optical axis of the objective lens is not deformed or inclined even if an unbalance in weight balance of the movable parts or an unbalance of left and right electromagnetic forces in focusing and tracking actuations occurs.

Further, since the crossing portion constituting the crossing axis is formed thick, the spring assembly can be reliably ejected from a mold without deforming the thin leaf springs during the injection molding.

What is claimed is:

1. An objective lens supporting mechanism for use in an objective lens actuator of an optical head, comprising:

an objective lens having an optical axis;
   means for holding said objective lens;
   first supporting means for supporting said objective lens holding means in a tracking direction of said objective lens, said first supporting means being substantially cross shaped and comprising at least one spring assembly which includes two similarly shaped leaf springs crossing each other, thereby forming a crossing axis which is parallel to said optical axis of said objective lens, said at least one spring assembly formed monolithically of resin as one unit;
   second supporting means for supporting said objective lens holding means in a focusing direction of said objective lens;
   first means for actuating said objective lens holding means in the focusing direction, said first actuating means being provided outside said first and second supporting means;
   second means for actuating said objective lens holding means in the tracking direction, said second actuating means being provided outside said first actuating means; and
   a magnet provided outside of said second actuating means.

2. The objective lens supporting mechanism of claim 1, wherein said crossing axis of said at least one spring assembly intersects a center of gravity of movable parts of the supporting mechanism comprising said objective lens, said objective lens holder, and said first and second actuating means.

3. The objective lens supporting mechanism of claim 1, wherein said first supporting means comprises one spring assembly.

4. The objective lens supporting mechanism of claim 1, wherein said first supporting means comprises a plurality of spring assemblies having crossing axes which lie on one line.

5. The objective lens supporting mechanism of claim 1, wherein said leaf springs cross each other at angles of 45° and 135° with respect to a longitudinal axis of the objective lens actuator.

6. The objective lens supporting mechanism of claim 1, wherein said leaf springs cross each other at angles of 0° and 90° with respect to a longitudinal axis of the objective lens actuator.

7. The objective lens supporting mechanism of claim 1, wherein a crossing portion of said two leaf springs is formed thick in a direction of a bisector of one of crossing angles formed by said two leaf springs.

8. The objective lens supporting mechanism of claim 7, wherein an area of a space of said thickened crossing portion is 0.3 mm or more.

9. The objective lens supporting mechanism of claim 7, wherein said thickened crossing portion is substantially round shaped.

10. The objective lens supporting mechanism of claim 7, wherein said thickened crossing portion is substantially square shaped.

11. The objective lens supporting mechanism of claim 1, wherein an end of said first supporting means is fixed to said objective lens holding means and another end of said first supporting means is fixed to said second supporting means.

12. The objective lens supporting mechanism of claim 1, wherein an end of said second supporting means is fixed to said objective lens holding means and another end of said second supporting means is fixed to said first supporting means.

13. The objective lens supporting mechanism of claim 1, wherein said at least one spring assembly and said objective lens holding means are formed as one unit.

14. The objective lens supporting mechanism of claim 1, wherein said at least one spring assembly and said second supporting means are formed as one unit.

15. The objective lens supporting mechanism of claim 1, wherein said at least one spring assembly, said objective lens holding means and said second supporting means are formed as one unit.

16. The objective lens supporting mechanism of claim 1, wherein said second supporting means comprises a pair of parallel leaf springs.

17. The objective lens supporting mechanism of claim 1, further comprising a supporting base for supporting one of said first and second supporting means, said supporting base being formed of an elastic material.

18. The objective lens supporting mechanism of claim 17, wherein said supporting base is formed of a resin.

19. The objective lens supporting mechanism of claim 17, wherein said supporting base is formed of an organic rubber.

20. The objective lens supporting mechanism of claim 1, wherein a thickness of each leaf spring is within a range between 0.1–0.15 mm.

* * * * *